J. C. SANDER.
METHOD OF SPOT WELDING.
APPLICATION FILED MAY 10, 1920.

1,416,883.

Patented May 23, 1922.

Inventor
JACOB C. SANDER
By his Attorneys
Townsend & Decker

UNITED STATES PATENT OFFICE.

JACOB C. SANDER, OF LYNN, MASSACHUSETTS, ASSIGNOR TO THOMSON SPOT WELDER COMPANY, OF BOSTON, MASSACHUSETTS, A CORPORATION OF MASSACHUSETTS.

METHOD OF SPOT WELDING.

1,416,883.   Specification of Letters Patent.   Patented May 23, 1922.

Application filed May 10, 1920. Serial No. 380,082.

*To all whom it may concern:*

Be it known that I, JACOB C. SANDER, a citizen of the United States, and a resident of Lynn, in the county of Essex and State of Massachusetts, have invented certain new and useful Improvements in Methods of Spot Welding, of which the following is a specification.

My present invention relates to electric welding processes, particularly applied to spot welding the surfaces of superposed metal plates, sheets or parts.

The object of the invention is to obtain a large, strong union between the parts, the weld being of greater area than that usually obtained when practicing the ordinary well known process of spot welding.

A further object is to effect a result which in the finished article will give the external impression that the parts are riveted together.

The invention consists in the improved method or process of spot welding hereinafter more particularly described and then specified in the claims.

In the accompanying drawings, Fig. 1 is a cross-section through work assembled between electrodes to be used in carrying out the present invention.

Figure 1:
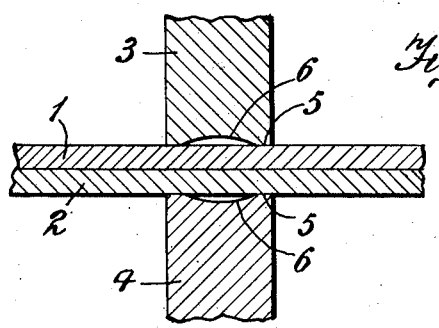
Figure 2:
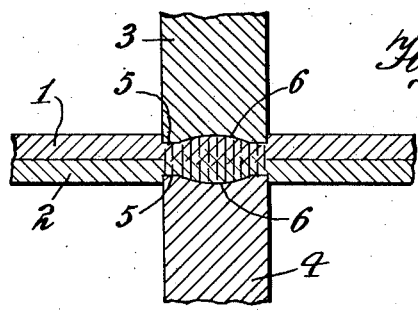
Fig. 2 is a similar view at the end of the welding operation.
Figure 3:
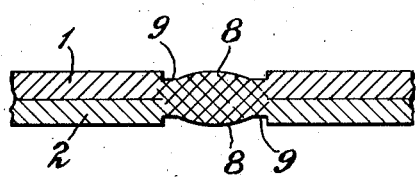
Fig. 3 is a cross-section through the work in line with the weld.
Figure 4:
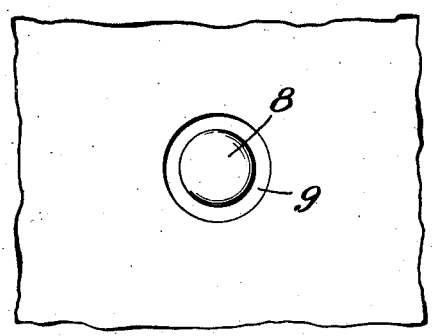
Fig. 4 is a plan view of the welded portion of the work.

In the drawings 1 and 2 indicates the superposed plates or other parts which it is desired to secure together by a welded union.

The plates are assembled together between electrodes 3, 4, preferably circular in cross-section, of an electric resistance welding machine of any suitable character, the details and mode of operation of which are well known and understood by those skilled in the art.

The electrodes 3 and 4 contact with the outer surfaces of the work on opposite sides and are aligned with each other. The contact face of each electrode is provided with an annular ring or ridge 5 surrounding a slight or shallow depression 6.

The electrodes contact with the surfaces of the work initially only on the ring or ridge 5, the depression 6 being out of contact with the plates in the initial stage of the process.

Upon passing the electric heating current from one electrode to the other in the usual manner, the plates become heated and plastic in line with the annular contacting ring 5. The center part of the work within the ring 5 becomes very hot and practically fluid as the electrodes do not contact with it (due to the depressions 6) and therefore do not carry the heat away from that part.

Upon applying the usual welding pressure the plates are first pressed together in an annular ring caused by the ridge 5. The continuing of this pressure upsets the heated spot sufficiently to cause the material of the heated section to bulge up and contact with the bottom of the depressions 6. When the final welding pressure is applied the depressions or cavities 6 apply pressure to the highly heated center of the spot and cause this part to amalgamate together, the result being a protuberance or bulge 8 on each outer surface of the work which resemble rivet heads. As the present process is usually practiced the protuberance 8 is surrounded by an annular depression 9.

What I claim as my invention is:—

1. The method of spot welding consisting in assembling the work between annular shaped electrodes each having a slight depression in its contact face, passing an electric current from one electrode to the other and applying pressure whereby the electrodes which initially only contacted with the work annularly, ultimately contact with the work over their whole faces and leave a resultant bulge on the surface of the work resembling a rivet.

2. The method of spot welding consisting in applying electrodes, each having a slight cavity in its contact face, to opposite sides of the lapped plates to be welded, whereby the electrodes contact initially with the work only around said cavities, passing an electric current from one electrode to the other and applying pressure until the bottom of the cavities in the electrodes contact with the work and continuing the pressure until the whole mass of the work in line with the electrodes is welded together, the result being a bulge on the surface of the work resembling a rivet head.

3. The method of spot welding consisting in assembling the work between electrodes each having an annular ridge surrounding a shallow depression in its contact face, passing an electric current from one electrode to the other across the work, applying pressure by means of the electrodes and continuing the pressure until the depression in the electrodes contacts with and applies pressure to the heated section of the work whereby bulges resembling rivet heads are formed on opposite sides of the work.

4. The method of spot welding consisting in assembling the work between electrodes each having an annular ridge surrounding a shallow depression in its contact face, passing an electric current from one electrode to the other across the work and applying pressure by means of the electrodes until the work fills the depressions in the electrodes whereby the whole area of the work bounded by the electrodes is united in a single weld characterized by a protuberance in the center.

Signed at New York, in the county of New York and State of New York, this 6th day of May, A. D. 1920.

JACOB C. SANDER.